Patented Sept. 14, 1943

2,329,632

UNITED STATES PATENT OFFICE 2,329,632

METHOD OF COATING GLASS

Charles P. Marsden, Jr., Bloomfield, N. J.

No Drawing. Application December 19, 1938,
Serial No. 246,672

5 Claims. (Cl. 117—97)

This invention relates to a method of applying adherent coatings to glass, especially for the kind of glassware such as is used in electric lamp bulbs and tubes, and for mercury vapor and other gas-discharge tubes, to solutions and compositions for these purposes, and to methods for preparing the same.

It is one of the objectives of the present invention to produce an interior frosted-glass effect, that is a controlled degree of partial opacity which will reduce the glare of an incandescent filament, without acid etching, but rather by means of a translucent coating on the interior surface of glass bulbs or tubing, which will be inert, harmless to the vacuum system, and yet capable of the gettering and/or keeping action.

Another object is to produce a coating on the inside of sealed glass containers of the kind described with an inert adhering agent with or without the addition of suitable opacifying, coloring, or fluorescing agents.

Another objective is to produce such coatings by a manner of application which will not require special additional steps for the removal of deleterious materials, such as alkalies, carbon, and other inorganic or organic matter; and otherwise to produce a coating which will not be subject to the deleterious effects of atmospheric humidity and gases as result, for example, from the use of borates or alkalies.

It is intended also to provide a method of application for the purposes stated which will not require the exacting technique necessary for mechanically spraying the inside of such glass bulbs and tubing.

A further object is to produce a translucent coating on the inside of glass bulbs or tubing which will be intimately adherent to the glass surface and which will also permit this container to be sealed to another piece of glass or appropriate ceramic material and yet permit the production of a vacuum-tight seal.

Another object is to provide a method of applying a colored or fluorescent coating to the inside of glass bulbs or tubing with an inert firmly adhering material comprising some form or multiple of $SiO_2$.

Other objects and advantages will become apparent as the disclosures hereinafter are better understood.

In the old art of applying coatings (either pigmented or fluorescent) to the inside of the glass containers for incandescent or gaseous discharge lights, it has been the practice to mix the coloring or other material with a binder such as sodium silicate. As this sodium salt is very sensitive to almost any other chemical besides water, it has been practically inexpedient to add various solvents, to vary the drying rate of the mixture. Therefore, the use of considerable heat and/or circulating air is required for drying and a spray gun is usually employed as a means of application to the glass surface. Such process requires specialized technique and considerable skill, and adapted mechanism is necessary to obtain a uniform sprayed film over the interior of the glass surface.

Furthermore, with sodium silicate, the alkali is acted upon by atmospheric humidity and gases and these are released later into the evacuated space with detrimental effects on the operation of the device, and this results in shortening the operating life.

Another known method of coloring and fluorescing the inside of tubes and the like has been to employ a lacquer vehicle for the given pigment or fluorescing material, and to apply the mixture by means of spraying, flushing, squirting, or painting. This lacquer method adapts itself readily enough to all of the above means of application, because the viscosity and rate of evaporation of the lacquer vehicle may be varied to control the desired thickness and uniformity of the coating. However, this method requires the subsequent removal of the carbon and other organic material, which necessitates heating the treated container to temperatures of approximately 450° C. in the presence of oxygen to remove the objectionable carbon. Obviously considerable care must be exercised in this operation to insure freedom from strains, to avoid subsequent cracking or splintering. Furthermore, if low-melting fluxes, such as zinc borate, are added to such lacquer mixtures, to act as binding agents for the pigment or fluorescent material, these low-melting compounds will occlude or retain in the coating appreciable amounts of unwanted organic material, unless great care and control is exercised in the heating operation.

In an attempt to overcome the above defects and other disadvantages of these coating methods, I have developed the use of ortho-silicic acid esters, preferably of the lower aliphatic alkyl series, such as methyl, methyl-ethyl, and ethyl esters. In my experiments, I have found that the tetraethyl ester of ortho-silicic acid is generally to be preferred because of its ready adaptability to the purposes of this invention and especially because of its presently commercial availability in relatively high degree of purity and at reasonable cost.

The given ester is reacted upon to produce a higher molecular weight compound by the addition of small amounts of acid preferably of mineral acid, and in the presence of relatively low moisture content to avoid too rapid formation of a silica gel. This results in a liquid medium of increased viscosity and quick evaporating rate, and serves adequately as a suspending medium where it is desired to incorporate pigment or fluorescing agent, thus obtaining the advantages of a lacquer medium, but free from the observed disadvantages.

Tetra-ethyl silicate has found varied commercial application in the hydrolysed form as a means for protecting architectural stone from the weather, as a painting medium for architectural and artistic painting, for reinforcing ceramic bodies such as crucibles, electrical insulators, and refractory and acid-resisting brick, and to increase the mechanical and chemical resistance of lacquer films by producing in the film a skeleton of silica. Further application has been for the fire-proofing of inflammable objects. Most of the methods have suggested, and even required, the additions of various substantial amounts of water, occasionally accelerated by additions of some amounts of acid.

The rate of setting of the film to firmness should be relatively slow, for the purposes of the present invention, so as to avoid to the greatest degree occlusion of organic matter. It is known that increasing amounts of added water very rapidly accelerate formation and hardening of the silica gel with the consequent occlusion of organic matter which may be present in any of the solvents or emulsifying agents employed.

I have found that while the reagents and solvents as employed in my process do not need to be absolutely anhydrous, it is desirable to hold the moisture content to a practical operating minimum as normally present in the reagents and generally to avoid the admixture of additional water.

I have found that where appreciable additions of water are made, the resulting film becomes too hard too rapidly, and because of this it tended to retain a certain amount of organically combined carbon, which is detrimental inside vacuum devices when operatively employed. Therefore, I have used methods approaching anhydrous conditions. For instance, in most of the reactions, I have used hydrochloric acid which is of normal commercial strength, 35% HCl.

A preferred embodiment of the invention is shown by the following formula:

Tetraethyl orthosilicate _____ cc__ 20
Acetone _____ cc__ 20
Hydrochloric acid C. P. (about 35% HCl)
                                         drops__ 3

It is generally preferable to mix the ester, the solvent, and the acid in the order named, but variations in amounts and order may obviously be made, as will further appear, to attain modified effects. It is very noticeable in the mixing of these three ingredients that the acid tends to form an immiscible layer with the ethyl silicate acetone layer. However, with a continuous agitation the mixture becomes substantially clear.

The product from this reaction is a liquid medium which has a relatively higher viscosity than the original ester employed, which dries very readily, as it contains only acetone, and the alcohol which is produced by the reaction. Further, this dried film has the unusual property of being very similar to an acid etch in its effect on translucency on glass. This film is then thermally decomposed by low heating into pure silica compounds with no trace of carbon compound residue.

It has also been noted that this film exhibits definite adsorptive properties which are desirable in vacuum devices as a gettering medium.

The increased viscosity of the condensation product also makes the mixture a better medium for the suspension of any added solid material and this also permits greater latitude for dilution with additional amounts of solvents as acetone, amyl acetate or alcohol of low water-content.

Examples of possible forms of constitution of the resultant silicate are shown below:

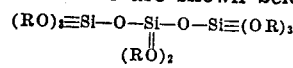

or

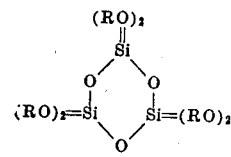

The mixture of condensed silicate ester as prepared above may then be mixed by appropriate means with pigmenting or fluorescing powders as by ball-milling, and then simply poured or flushed into the glass bulb or tube or other container. Any excess of liquid is then drained and subsequently the film is permitted to dry. Forced cold or warmed air may be used to expedite this operation. In this process it is not necessary to heat the glass container to the temperatures as is necessary for the removal of all organic matter in the lacquer method.

In this heating operation, the remaining alkyl groups are broken away from the acid radical perhaps by decomposition or possibly by hydrolysis. However, the essential point is that in this "breaking away," the alkyl groups are removed completely so that no organic materials remain. In this connection, it has been observed that high-humidity atmospheric conditions appear to have no deleterious effect on the decomposition.

The resultant coating on the glass will be smooth and of even texture, resistant to normal abrasion, adhere well to the glass, and contain no carbon. This film, being composed of some form or multiple of substantially pure silica, will be unaffected by atmospheric moisture, gases, and so forth.

An illustrative example of a mixture that has been found satisfactory for coating fluorescent material on tubing, such as is used in the neon sign trade, is embodied in the following formula:

"Condensed" silicate ester _____ cc__ 2
Zinc ortho silicate _____ gm__ 5
Acetone _____ cc__ 3
Butyl Acetate _____ cc__ 2

The term "condensed" silicate ester is here used to designate the product of the reaction resulting from the mixture of a silicate ester, volatile organic solvent, and acid as described heretofore. The condensation reaction is of a complicated nature and has not been definitely ascertained.

This mixture may be applied to the glass container by any of the usual methods, the excess allowed to drain, the film air-dried and subsequently heated to decompose and/or evaporate all the volatile organic matter. Obviously, many other fluorescent powders may be used such as calcium tungstate, magnesium beryllium silicate, cadmium tungstate, and so forth, according to convenience and color effects desired.

An example of a mixture that has been found satisfactory for coating pigmenting materials on glass bulbs or tubing is embodied in the following formula:

"Condensed" silicate ester ---------------- cc-- 2
Cadmium sulphide red ------------------ gm-- 5
Acetone ---------------------------------- cc-- 3
Butyl acetate --------------------------- cc-- 2

In this and the previous formulas, the kind and ratio of the solvents may be purposefully varied optionally to suit the particular application. Thus, ethyl acetate, "cellosolve," or toluol may replace more or less or all of the acetone and/or butyl acetate. This mixture may be applied to the inside of the glass envelope by any of the usual methods, the excess allowed to drain, the deposited film air-dried, and subsequently moderately heated to remove all the organic volatile matter. Obviously, other inorganic pigments such as burnt sienna, ultramarine blue, Veronese green, and so forth, may be used and fillers such as kaolin and barium sulphate may be added according to purpose and convenience.

An example of a method that has been found satisfactory for use in producing the "frosted" or opal surface on the glass container is to take merely the plain undiluted "condensed" silicate ester and by atomizing, spraying, or flushing the liquid into a heated bulb or tube, cause the rapid evaporation and breaking off of the remaining attached alkyl groups and thus producing a white "frosted" or opalescent coating which while having a more or less "dusty" appearance has really attained a more than sufficient adhesion to the glass to withstand any rush of air or gas which may be created within the vacuum system.

Variations in this coating may be obtained ranging from a pure white, equivalent to opal glass, to a frosty appearance resembling the common inside-acid-frosted bulb. These variations are made possible by varying the degree and character of reaction or condensation which takes place between the silicate ester with the acid. Thus by mixing the acid and acetone first and adding this mixture to the silicate ester, there is produced a product which gives on drying and decomposition a white frosty coating, while if the acid ratio is increased over the preferred formula given above, the result is a coating which has only slight frostiness. Variations may also be produced by varying the amount of acetone used in the formula, thus changing the rate of mixing of the acid layer with the ester layer. This latter variation may also be accomplished by adding the acid diluted with, for example, ten volumes of acetone, very slowly drop by drop with continuous agitation of the ester mixture.

The advantage of the product of the condensation reaction as employed in this invention over the usual hydrolysed material, as is more generally used in other branches of art, is the fact that it is more stable over a period of time. This stability is due to the fact that the reaction is practically anhydrous.

Another important advantage of this condensed ester is as a vehicle for spraying, where spraying might be desirable, as it is possible to vary the organic solvents optionally to adapt the drying rate so that there is considerably more flexibility to the handling of the spray solution than is possible with alkali silicate mixtures. For instance, the inside spraying of lamp bulbs as practised in the existing art is made difficult due to the troublesome fact that the spray dries very hard on the nozzle of the spray gun and requires hand cleaning with a stiff brush and alkali solution, however well mechanized the other operations of the machine may be. However, with my mixture a small amount of high-boiler such as ethyl "cello-solve" may be added to keep the spraying material, which is deposited on the nozzle, in a soft and easily removable condition, thus permitting automatic brushing of the nozzle to keep it clean.

The various examples given herein are presented by way of illustration and not of limitation and are obviously capable of considerable variation without departing from the spirit and scope of the invention as disclosed.

I claim:

1. A method of coating the interior walls of incandescent light bulbs, vacuum tubes, and the like, which comprises applying to the interior glass walls of such apparatus, before sealing, a solution of the intermolecular condensation products of a lower alkyl ortho-silicic acid ester produced by the action of a strong mineral acid in a volatile organic solvent miscible both with the acid and the ester, draining off the excess liquid, and applying moderate heat until such condensed ester has undergone complete thermal decomposition and until all the volatile solvent and all the alcohol formed by thermal decomposition of the ester by such heat, have evaporated, the entire process being conducted under conditions of freedom from water in the solution in sufficient quantity to effect any appreciable aqueous hydrolysis of the ester.

2. A method of coating the interior walls of incandescent light bulbs, vacuum tubes, and the like, which comprises applying to the interior glass walls of such apparatus, before sealing, a solution of the intermolecular condensation products of a lower alkyl ortho-silicic acid ester produced by the action of a strong mineral acid in solution in a volatile organic solvent of low boiling point and having suspended therein a finely comminuted inorganic material, chemically inert with respect to the other ingredients, draining off the excess liquid, and applying moderate heat until the intermolecularly condensed ester has undergone thermal decomposition and until the volatile solvent and all the alcohol formed by the thermal decomposition of the ester by such heat, have been evaporated, the entire process being conducted under conditions of freedom from water in the solution in sufficient quantity to effect any appreciable aqueous hydrolysis of the ester.

3. A method of coating the interior of incandescent light bulbs, vacuum tubes and the like, which comprises applying to the interior glass walls of such apparatus, before sealing, a solution of the intermolecular condensation products of a lower aliphatic alcohol ortho-silicic acid ester produced by the action of a strong mineral acid in a volatile organic solvent of low boiling point, and having dispersed therein an inorganic pigmenting agent, chemically inert to the other ingredients, draining off the excess liquid, and applying moderate heat until the modified ester has undergone thermal decomposition and until the volatile solvent and all the alcohol formed by the thermal decomposition of the ester by such heat, have been evaporated, the entire process being conducted under conditions of freedom from water in the solution in sufficient quantity to effect any appreciable aqueous hydrolysis of the ester.

4. A method of coating the interior of incandescent light bulbs, vacuum tubes and the like, which comprises applying to the interior glass walls of such apparatus, before sealing, a solution of the intermolecular condensation products of a lower aliphatic alcohol ortho-silicic acid ester produced by the action of a strong mineral acid in a volatile organic solvent of low boiling point, and having dispersed therein an inorganic fluorescing agent, chemically inert to the other ingredients, draining off the excess liquid, and applying moderate heat until the modified ester has undergone thermal decomposition and until the volatile solvent and all the alcohol formed by the thermal decomposition of the ester by such heat, have been evaporated, the entire process being conducted under conditions of freedom from water in the solution in sufficient quantity to effect any appreciable aqueous hydrolysis of the ester.

5. A method of coating the interior walls of incandescent light bulbs, vacuum tubes, and the like, which comprises applying to the interior glass walls of such apparatus, before sealing, a solution of the intermolecular condensation products of tetra-ethyl ortho-silicic acid ester produced by the action of a strong mineral acid, in a volatile organic solvent miscible both with the acid and the ester, draining off the excess liquid, and then applying moderate heat until all of the intermolecularly condensed ester has undergone thermal decomposition and until all of the volatile solvent and the alcohol formed by the thermal decomposition of the ester by such heat have been evaporated, the entire process being conducted under conditions of freedom from water in the solution in sufficient quantity to effect any appreciable aqueous hydrolysis of the ester.

CHARLES P. MARSDEN, Jr.